(12) United States Patent
Kumagai et al.

(10) Patent No.: US 7,817,334 B2
(45) Date of Patent: Oct. 19, 2010

(54) WAVELENGTH CONVERSION ELEMENT, LIGHT SOURCE DEVICE, IMAGE DISPLAY DEVICE, AND MONITOR DEVICE

(75) Inventors: Keiko Kumagai, Minamiminewa-village (JP); Akira Komatsu, Tastuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 436 days.

(21) Appl. No.: 12/019,096

(22) Filed: Jan. 24, 2008

(65) Prior Publication Data

US 2008/0186710 A1 Aug. 7, 2008

(30) Foreign Application Priority Data

Feb. 6, 2007 (JP) ............................. 2007-026376

(51) Int. Cl.
*G02F 1/35* (2006.01)
*H01S 3/10* (2006.01)
(52) U.S. Cl. ................ 359/326; 359/328; 359/330; 372/21; 372/22
(58) Field of Classification Search .......... 359/326–330
See application file for complete search history.

(56) References Cited

U.S. PATENT DOCUMENTS

| | | | |
|---|---|---|---|
| 5,233,620 A | 8/1993 | Shinozaki et al. | |
| 5,448,398 A | 9/1995 | Asakura et al. | |
| 5,617,435 A | 4/1997 | Nagai et al. | |
| 6,288,832 B1 * | 9/2001 | Richman et al. ............ | 359/330 |
| 2006/0023173 A1 | 2/2006 | Mooradian et al. | |
| 2006/0023757 A1 | 2/2006 | Mooradian et al. | |
| 2006/0268241 A1 | 11/2006 | Watson et al. | |
| 2006/0280219 A1 | 12/2006 | Shchegrov | |
| 2007/0153862 A1 | 7/2007 | Shchegrov et al. | |

2007/0153866 A1 7/2007 Shchegrov et al.

(Continued)

FOREIGN PATENT DOCUMENTS

JP       A-49-75346       7/1974

(Continued)

OTHER PUBLICATIONS

Aram Mooradian et al., "High Power Extended vertical Cavity Surface Emitting Diode Lasers and Arrays and Their Applications", Micro-Optics conference, Tokyo, Japan, Nov. 2, 2005.

(Continued)

*Primary Examiner*—Hemang Sanghavi
(74) *Attorney, Agent, or Firm*—Oliff & Berridge, PLC (57) ABSTRACT

A wavelength conversion element includes a second harmonic wave generating element provided with an entrance surface and an emission surface, a function of converting an incident fundamental wave into a second harmonic wave with a different wavelength and emitting the second harmonic wave, and a cyclic polarization inversion structure configured so as to be able to match a phase of the second harmonic wave in a pseudo manner, and a first wavelength dispersive optical element disposed on the entrance surface side of the second harmonic wave generating element, having a first diffraction surface for diffracting an incident light beam with a diffraction angle increasing in accordance with a wavelength of an incident light beam to disperse the incident light beam by the wavelength of the incident light beam, and for emitting the light beam dispersed in the first diffraction surface towards the second harmonic wave generating element.

15 Claims, 9 Drawing Sheets

U.S. PATENT DOCUMENTS

2009/0040596 A1    2/2009    Mizuuchi et al.

FOREIGN PATENT DOCUMENTS

| JP | A-04-107536 | 4/1992 |
| JP | A-06-102552 | 4/1994 |
| JP | A 6-160926 | 6/1994 |
| JP | A-7-199249 | 8/1995 |
| JP | A-07-318996 | 12/1995 |
| JP | A-09-236724 | 9/1997 |
| WO | WO 2006/112303 | 10/2006 |

OTHER PUBLICATIONS

"Tuning and Wideband Intensity Modulation of Noncollinear Quasi-Phase-Matched Second-Harmonic-Generation Using Pockets Effect", Kojiro Koyanagi, Teruhito Mishima and Ichiro Sakuraba, Electronic Information Communication Study Thesis; C-1, vol. J78-C-I, No. 10, pp. 448-458, Oct. 1995.

* cited by examiner

WAVELENGTH CONVERSION ELEMENT, LIGHT SOURCE DEVICE, IMAGE DISPLAY DEVICE, AND MONITOR DEVICE

This application claims priority from Japanese Patent Application No. 2007-026376 filed in the Japanese Patent Office on Feb. 6, 2007, the entire disclosure of which is hereby incorporated by reference in its entirety.

BACKGROUND

1. Technical Field

The present invention relates to a wavelength conversion element for converting a wavelength using a second harmonic wave generating element, and a light source device, an image display device, and a monitor device using the wavelength conversion element.

2. Related Art

An image display device such as a projector irradiating a spatial light modulator such as a liquid crystal light valve or a digital micromirror device (DMD) with irradiation beams from a light source device to display an image has been used. A laser source device for emitting a laser beam is sometimes used as the light source device.

Some of such laser source devices are each provided with a laser emitting element such as a laser diode and a nonlinear optical element in order for generating a visible light beam. The nonlinear optical element is an element for expressing a nonlinear optical effect such as generation of an optical harmonic wave or an optical parametric effect by light and a material causing a vary strong interaction. The wavelength conversion element is an element utilizing the optical harmonic wave generation effect out of the above nonlinear optical effects. In the wavelength conversion element, it is required to align the phases of the harmonic waves generated on the light path of the fundamental wave in order for improve the conversion efficiency. This phase matching includes birefringent phase matching utilizing birefringence of the nonlinear optical element and quasi-phase matching utilizing a cyclic polarization inversion structure. In the nonlinear optical element of recent years, the quasi-phase matching is often used because of an advantages that there is no limitation in the conversion wavelength and that the conversion efficiency is high, and of progress in the polarization inversion technology.

JP-A-6-160926 is an example of a related art document.

However, an appropriate polarization invention period is different in accordance with the wavelength of the fundamental wave, and the range of the fundamental wave which can be converted is very narrow. Since the wavelength of the fundamental wave has variations caused by the individual difference in the laser emitting element, and further, varies in accordance with the temperature of the laser emitting element or the environmental temperature, it is difficult to always match the phase of the fundamental wave with the conversion wavelength determined in accordance with the polarization inversion period. Therefore, in the laser source device using the nonlinear optical element, there is a problem that decrease in the wavelength conversion efficiency is caused by the mismatch between the conversion wavelength and the wavelength of the fundamental wave, which makes laser beam emission with stable output power difficult.

The problem mentioned above is not specific to the image display device, but is common to a monitor device or a lighting device equipped with the laser source device using the nonlinear optical element as the wavelength conversion element.

SUMMARY

An advantage of some aspects of the invention is to provide laser beam emission with stable output power.

According to a first aspect of the invention, there is provided a wavelength conversion element including a second harmonic wave generating element provided with an entrance surface and an emission surface, a function of converting an incident fundamental wave into a second harmonic wave with a different wavelength and emitting the second harmonic wave, and a cyclic polarization inversion structure configured so as to be able to match a phase of the second harmonic wave in a pseudo manner, and a first wavelength dispersive optical element disposed on the entrance surface side of the second harmonic wave generating element, having a first diffraction surface for diffracting an incident light beam with a diffraction angle increasing in accordance with a wavelength of an incident light beam to disperse the incident light beam by the wavelength of the incident light beam, and for emitting the light beam dispersed in the first diffraction surface towards the second harmonic wave generating element.

According to the wavelength conversion element of the first aspect of the invention, since the first wavelength dispersive optical element is capable of dispersing the incident light beam with a diffraction angle in conjunction with the wavelength, the light beam entering the first wavelength dispersive optical element is emitted to the second harmonic wave generating element at an angle different in accordance with the wavelength of the light beam. The light beam entering the polarization inversion structure at an angle has a polarization inversion pitch different in accordance with the incident angle of the light beam. Therefore, if the diffraction angle and the pitch of the polarization inversion of the wavelength dispersive optical element are set so that the optimum polarization inversion pitch can be obtained in accordance with each of the wavelengths thus dispersed, the optimum conversion efficiency can be obtained for any wavelengths.

In the wavelength conversion element according to the first aspect of the invention, it is possible to further include a second wavelength dispersive optical element disposed on the emission surface side of the second harmonic wave generating element, having a second diffraction surface for diffracting an incident light beam with a diffraction angle increasing in accordance with a wavelength of the incident light beam to disperse the incident light beam by the wavelength of the incident light beam, the second diffraction surface being configured to have a diffraction angle, which corresponds to a light beam with a predetermined wavelength, substantially identical to a diffraction angle of the first diffraction surface, which corresponds to a light beam with the predetermined wavelength.

According to the wavelength conversion element of the first aspect of the invention, since the first wavelength dispersive optical element and the second wavelength dispersive optical element are capable of diffracting the light beam with a predetermined wavelength with substantially the same diffraction angle, the emitted light beam can be emitted in a direction substantially parallel to the direction of the incident light beam. Therefore, the light path of the emitted light beam can simply be configured.

In the wavelength conversion element of the first aspect of the invention, it is possible that the second wavelength dispersive optical element is formed to have a planer surface on an opposite side to a surface facing the second harmonic wave generating element, and the surface facing the second harmonic wave generating element and the emission surface of the second harmonic wave generating element are bonded with each other.

Further, in the wavelength conversion element of the first aspect of the invention, it is possible that the first wavelength dispersive optical element is formed to have a planer surface on an opposite side to a surface facing the second harmonic wave generating element, and the surface facing the second harmonic wave generating element and the entrance surface of the second harmonic wave generating element are bonded with each other.

According to the first aspect of the invention, by bonding the wavelength dispersive optical element and the second harmonic wave generating element with each other, the boundaries between the optical elements and the air can be reduced, the surface reflection can be reduced, thus the laser oscillation efficiency can be improved.

In the wavelength conversion element of the first aspect of the invention, it is possible that the first wavelength dispersive optical element is a transmissive grating having the first diffractive surface formed to have a saw-tooth shape.

In the wavelength conversion element of the first aspect of the invention, it is possible that the second wavelength dispersive optical element is a transmissive grating having the second diffractive surface formed to have a saw-tooth shape.

According to the wavelength conversion element of the first aspect of the invention, since the energy of the light beams thus dispersed is concentrated into the primary light beam when the transmissive grating with the diffraction surface formed to have a saw-tooth shape is used, the incident light beam can be diffracted at high efficiency.

According to a second aspect of the invention, there is provided a light source device including a light source for emitting the fundamental wave, the wavelength conversion element of the first aspect of the invention, and a reflecting member disposed on an emission side of the wavelength conversion element, and for reflecting the fundamental wave while transmitting the second harmonic wave.

According to the second aspect of the invention, the high conversion efficiency can always be kept in the wide range of the wavelength of the fundamental wave by the wavelength conversion element according to the first aspect of the invention. Therefore, the light source device according to the second aspect of the invention can output the laser beam with a stable output irrespective of the variation of the light source for emitting the fundamental light beam or the temperature variation.

According to a third aspect of the invention, there is provided a light source device including a light source for emitting the fundamental wave, and a reflecting member for reflecting the fundamental wave while transmitting the second harmonic wave.

In the light source device according to the third aspect of the invention, it is possible that the second wavelength dispersive optical element is disposed so that the second diffraction surface faces the second harmonic wave generating element, and is formed to have a planer surface on an opposite side to the second diffraction surface with respect to the second harmonic wave generating element, and the reflecting member is formed on the planar surface of the second wavelength dispersive optical element.

According to the third aspect of the invention, since the reflecting mirror as the resonator mirror and the wavelength conversion element can be formed integrally, the light source device can be downsized.

According to a fourth aspect of the invention, there is provided an image display device including the light source device according to the second or the third aspect of the invention, and a projection section that projects an image formed by the light beam emitted from the light source device.

According to the fourth aspect of the invention, an image can be displayed using the light source device with stable output, and consequently, convenience of the observer can be enhanced. Further, since the wavelength range of each of the visible light sources of RGB is narrow, an image with high color purity, very bright, and wide color reproducibility range can be provided.

According to a fifth aspect of the invention, there is provided a monitor device including the light source device according to the second or the third aspect of the invention, and an imaging section that shoots a subject irradiated with the light beam emitted from the light source device.

Since the monitor device is used, for example, in the medical scene, it is desirable that the output power of the light source is stable. Therefore, according to the fifth aspect of the invention, the subject can be irradiated with the stable laser beam, and consequently, safety and convenience of the user can be enhanced.

The various aspects of the present invention described above can be combined or partially eliminated according to needs.

BRIEF DESCRIPTION OF THE DRAWINGS

The invention will now be described with reference to the accompanying drawings, wherein like numbers reference like elements.

DETAILED DESCRIPTION OF EMBODIMENTS

A. First Embodiment

A1. System Configuration

Figure 1:
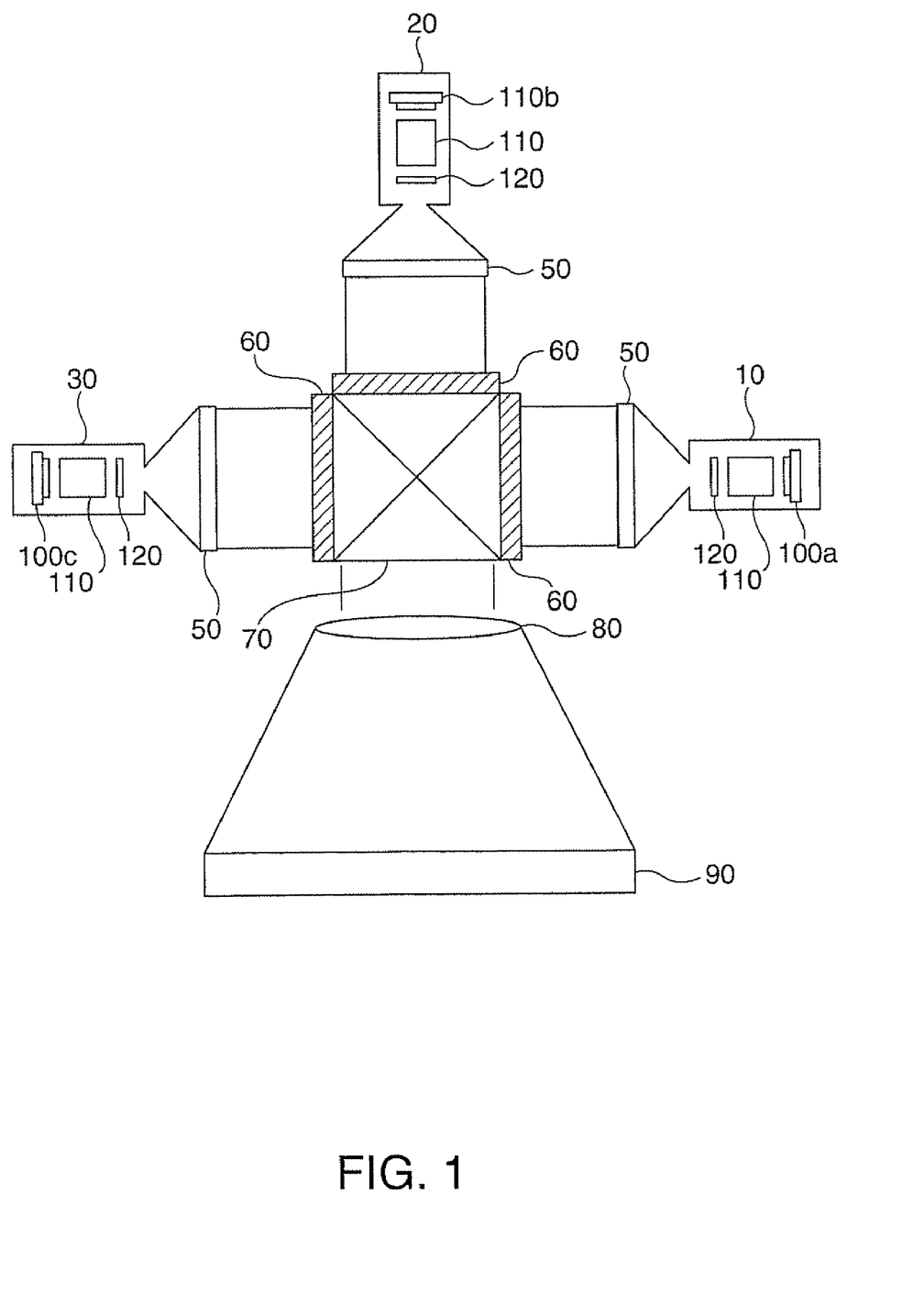
FIG. 1 is an explanatory diagram for exemplifying a schematic configuration of a projector according to a first embodiment.

A projector as an image display device according to a first embodiment of the invention will be explained with reference to FIG. 1. FIG. 1 is an explanatory diagram for exemplifying a schematic configuration of the projector according to the first embodiment.

As shown in FIG. 1, the projector 1000 is provided with light source devices 10, 20, and 30, equalizing optical elements 50, light valves 60, a cross prism 70, and a projection lens 80.

The light source devices 10 through 30 are used as the light source of the projector 1000. The light source device 10 outputs a red laser beam with a wavelength of about 650 nm, the light source device 20 outputs a green laser beam with a wavelength of about 540 nm, and the light source device 30 outputs a blue laser beam with a wavelength of about 430 nm. It should be noted that since the laser beam is absorbed by various instruments, the intensity of the light beam output form the semiconductor layer device and the intensity of the light beam used for projecting an image are a little bit different from each other. A detailed configuration of the light source devices 10 through 30 will be described in detail later.

The equalizing optical element 50 overlaps the incident irradiation light beams with each other to equalize the variation in luminance, thus reducing the difference between the light intensity in the edge section of the screen and that in the center section thereof. By providing the equalizing optical element 50, a bright image can be projected on the entire screen.

The light valve 60 is formed using high temperature polysilicon (HTPS), and is a transmissive liquid crystal panel of an active matrix drive type. The light valve 60 controls the incident light beam to draw an image.

The cross prism 70 has a configuration of a cuboid formed by combining four triangular prisms, combines the red laser beam, the green laser beam, and the blue laser beam respectively transmitted through the light valves 60 to form an image, and project the image on the projection lens 80 corresponding to a projection section.

The projection lens 80 projects the image projected from the cross prism 70 on the screen 90.

As described above, the projector 1000 inputs the light beams emitted from the light source devices 10 through 30 respectively to the light valves 60 to form an image, and then combines the emitted light beams to project it on the screen 90. The viewer views the image projected on the screen 90.

A2. Configuration of Light Source Device

Figure 2:
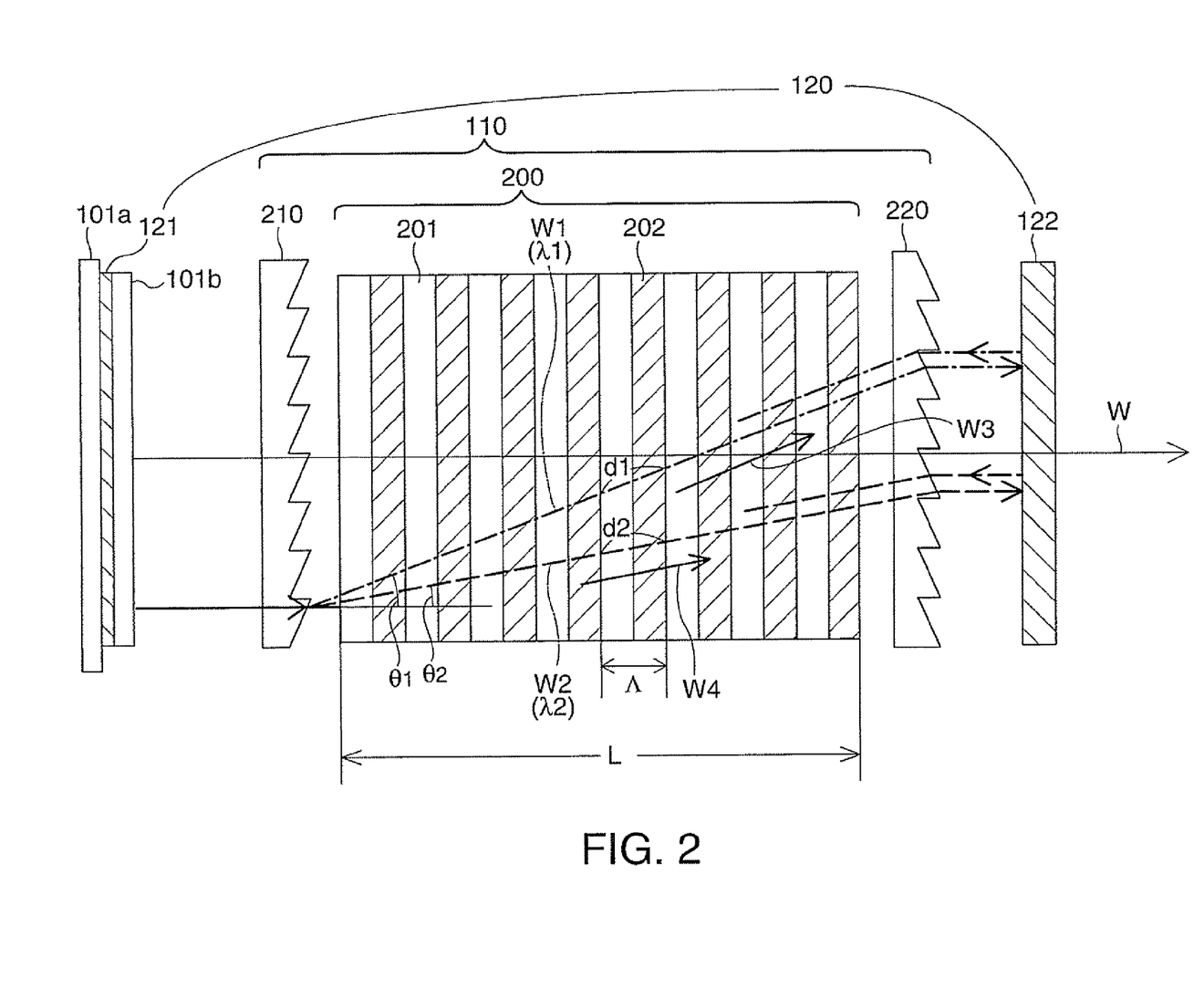
FIG. 2 is an explanatory diagram for exemplifying a schematic configuration of a light source device according to the first embodiment.
Figure 3A:
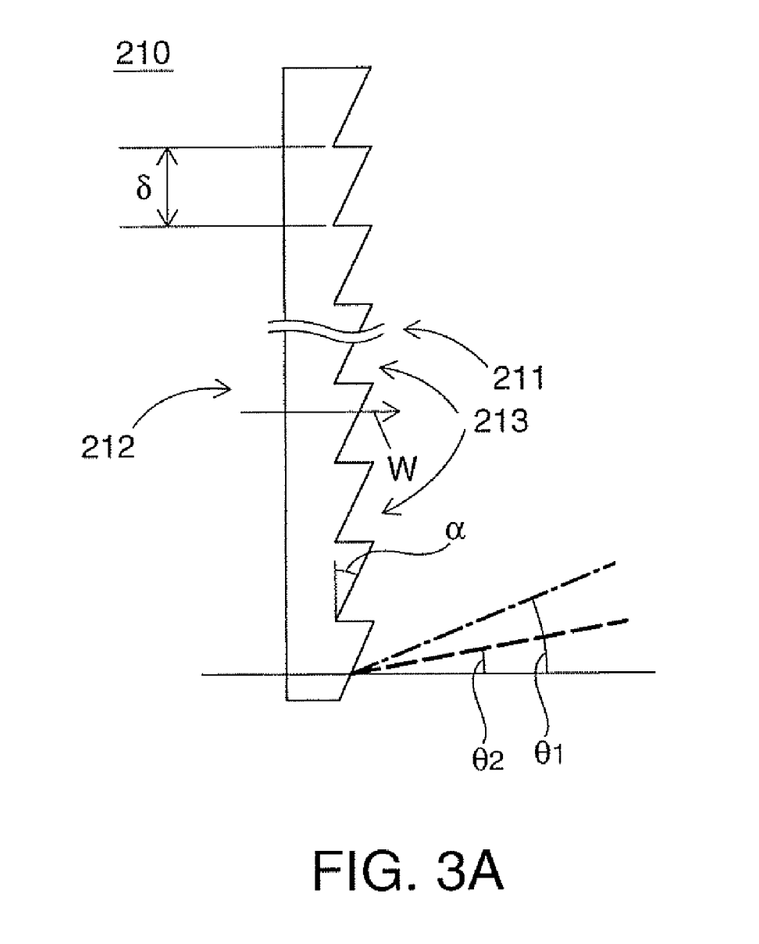
FIGS. 3A and 3B are explanatory diagrams for exemplifying a configuration of a wavelength conversion element according to the first embodiment.
Figure 3B:
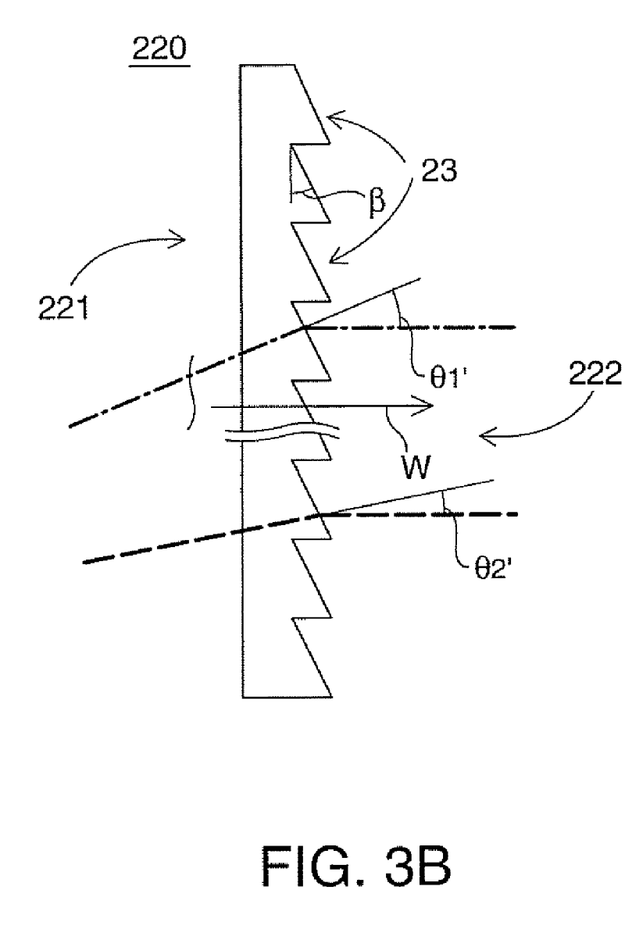

The detailed configuration of the light source device according to the first embodiment of the invention will be explained with reference to FIGS. 2, 3A, and 3B. FIG. 2 is an explanatory diagram for exemplifying a schematic configuration of the light source devices according to the first embodiment. FIGS. 3A and 3B are explanatory diagrams for exemplifying a configuration of the wavelength conversion element according to the first embodiment. Since the light source devices 10 through 30 are similarly configured except the wavelengths of the laser beams emitted therefrom, the explanations are presented in the first embodiment exemplifying the light source device 10.

As shown in FIG. 2, the light source device 10 is provided with a semiconductor laser device 100a as a laser source, a wavelength conversion element 10, and a resonator 120.

The semiconductor laser device 100a of the light source device 10 outputs a laser beam having a peak wavelength of about 1300 nm double as long as the peak wavelength of the red laser beam of about 650 nm. It should be noted that the semiconductor laser device of the light source device 20 outputs a laser beam having a peak wavelength of about 1080 nm double as long as the peak wavelength of the green laser beam of about 540 nm, and the semiconductor laser device of the light source device 30 outputs a laser beam having a peak wavelength of about 860 nm double as long as the peak wavelength of the blue laser beam of about 430 nm.

The wavelength conversion element 110 is an optical element for converting the wavelength of the incident light beam into a half thereof. The wavelength conversion element 110 will be explained in detail later.

The resonator 120 has a pair of mirrors 121, 122, wherein the mirror 122 reflects the fundamental wave, and transmits the second harmonic wave. These mirrors 121, 122 are provided so that a light emitting section 101b is positioned therebetween. The resonator 120 is configured so that the reflected light beams stand face to face and reciprocate between the mirrors 121, 122 of the resonator, thus amplifying the light beam with a predetermined wavelength by the resonance between the mirrors of the resonator. Specifically, the mirror 122 provided to the light emission side of the light emitting section 101b reflects the incident laser beam towards the mirror 121 on the side of the light emitting element 101a. The mirror 121 on the side of the light emitting element 101a reflects the light beam reflected by the mirror 122 disposed on the light emission side of the light emitting section 101b towards the mirror 122. As described above, a light beam with a predetermined wavelength out of the light beams entering the resonator 120 is repeatedly reflected by the mirrors 121, 122, thus the laser oscillation is caused. The laser beam thus oscillated is converted into a second harmonic wave by the wavelength conversion element 110, thus being transmitted through the mirror 122 of the resonator. The mirrors 121, 122 of the resonator can be formed using, for example, a semiconductor multilayer film or a dielectric multilayer film.

A3. Detailed Configuration of Wavelength Conversion Element

The wavelength conversion element 110 is provided with a second harmonic wave generating element 200 and transmissive gratings 210, 220 as wavelength dispersive optical elements.

The second harmonic wave generating element 200 is a nonlinear optical element composed of a substrate (hereinafter referred to as a dielectric substrate in the present specification) made of ferroelectric such as lithium niobate ($LiNbO_3$), lithium tantalate ($LiTaO_3$), or potassium titanate phosphate ($KTiOPO_4$), and for converting the wavelength of the incident light beam into a half thereof. The light beam output from the semiconductor laser device 100a and proceeding towards the resonator 120 is converted into a light beam with a half wavelength thereof by being transmitted through the second harmonic wave generating element 200. In other words, the light beams output from the semiconductor laser devices 100a, 100b, and 100c of the respective light source devices 10, 20, and 30 are converted into visible light beams by being transmitted through the second harmonic wave generating element 200. The wavelength conversion efficiency of the second harmonic wave generating element 200 has a nonlinear characteristic, in which the higher the intensity of the laser beam entering the second harmonic wave generating element 200 is, the more the conversion efficiency improved, for example. Further, the conversion efficiency of the second harmonic wave generating element 200 is about several percents. In the second harmonic wave generating element 200, a wavelength of the fundamental wave to be converted is determined in accordance with the polarization inversion period Λ.

The second harmonic wave generating element 200 has polarization regions 201 and polarization inversion regions 202 having polarization directions different from each other. The polarization region 201 has a direction of the spontaneous polarization of the dielectric substrate as the polarization direction. The polarization inversion region 202 has the polarization direction reversed from the direction of the spontaneous polarization of the dielectric substrate, namely 180 degrees different therefrom. Further, the polarization region 201 and the polarization inversion region 202 are patterned in a cyclic manner in a direction of the optical axis W. Such a cyclic polarization structure is generally called a cyclic polarization inversion structure. The length of one polarization region 201 and one polarization inversion region 202 adjacent thereto along the optical axis W forms the polarization inversion period Λ of the polarization inversion structure.

The second harmonic wave generating element 200 generates a second harmonic wave with a wavelength half as long as that of the incident light beam using the nonlinear optical effect, and matches the phase of the generated second harmonic wave in a pseudo manner using the quasi-phase matching (QPM), thus obtaining the high conversion efficiency.

The QPM is a method of matching the phase by providing the cyclic polarization inversion structure inside the nonlinear optical element to compensate the difference in wave vector between the fundamental wave and the second harmonic wave with the wave vector K ($|K|=2\pi/\Lambda$) corresponding to the polarization inversion period Λ of the polarization inversion structure. In the first embodiment, the phase of the second harmonic wave is matched when a Formula 1 below is true. The Formula 1 is called a phase matching condition. It should be noted that in the Formula 1, λ denotes the wavelength of the fundamental wave transmitted through the second harmonic wave generating element, $n_f$ denotes a refractive index of the fundamental wave in the second harmonic wave generating element 200, and $n_s$ denotes a refractive index of the second harmonic wave in the second harmonic wave generating element 200, $$\Lambda=\lambda/2(n_f-n_s) \quad \text{Formula 1}$$

The transmissive grating 210 is made, for example, of soda glass, and is formed to have a planar shape with a predetermined thickness. A grating, namely a diffraction grating, is a kind of a dispersive optical element for diffracting light beams with different wavelengths at diffraction angles corresponding to the wavelengths to disperse them. When the light beam enters a plurality of grooves provided to the grating, the incident light beam is diffracted, reinforcing each other in a certain direction specified for each wavelength, and the light beam is oriented at a diffraction angle specified for each wavelength.

As shown in FIG. 3A, the transmissive grating 210 is provided with a plurality of grooves 213 formed on a first surface 211 facing the second harmonic wave generating element 200 at substantially even intervals, and a planar shape on a second surface 212 opposite to the first surface. As shown in FIG. 3A, the cross-section of the groove 213 has a saw-tooth shape, and formed to have a gradient angle of α between a plane perpendicular to the optical axis W and the tilted surface of the groove. Hereinafter, the gradient angle of the tilted groove surface is referred to as a blaze angle.

The first surface 211 is a surface for causing the diffraction, and the diffraction angle of the diffraction caused by the transmissive grating 210 is determined accordingly in accordance with the wavelength of the light beam, the number of grooves, the incident angle, and so on.

The grating 220 will be explained with reference to FIG. 3B. Similarly to the transmissive grating 210, the transmissive grating 220 is made, for example, of soda glass, and is formed to have a planar shape with a predetermined thickness. A first surface 221 of the transmissive grating 220 facing the second harmonic wave generating element 200 is formed to have a planar shape, and a second surface 222 on the opposite side to the first surface is provided with a plurality of grooves 223 formed thereon at substantially even intervals. As shown in FIG. 3B, the cross-section of the groove 223 has a saw-tooth shape, and the blaze angle thereof is β.

A4. Regarding Operation of Wavelength Conversion Element

An operation of the wavelength conversion element according to the first embodiment of the invention will be explained with reference to FIGS. 2, 3A, and 3B. In the first embodiment, the explanation will be presented exemplifying light beams W1, W2 respectively having two kinds of wavelengths λ, λ2 (λ1>λ2) as the fundamental waves F emitted from the semiconductor laser device 100a. In the case with the light beam W2 having the fundamental wave F with a wavelength of λ2, the light beam W2 is diffracted by the transmissive grating 210 at a diffraction angle θ2 corresponding to the wavelength λ2, and then enters the second harmonic wave generating element 200. On the other hand, in the case with the light beam W1 having the fundamental wave F with the wavelength λ1, the light beam W1 is diffracted by the transmissive grating 210 at a diffraction angle θ1 greater than the diffraction angle θ2, and enters the second harmonic wave generating element 200. Specifically, the light beam W2 with the wavelength λ2 enters the second harmonic wave generating element 200 at an incident angle θ2, and the light beam W1 with the wavelength λ1 larger than the wavelength λ2 enters the second harmonic wave generating element 200 at an incident angle θ1 greater than the incident angle θ2.

It should be noted that the diffraction angle θ1 includes a refraction angle of the refraction caused on the tilted groove surface of the first surface 211 as the diffraction surface of the transmissive grating 210, and the diffraction angle θ2 includes a refraction angle of the refraction caused on the tilted groove surface of the second surface 222 as the diffraction surface of the transmissive grating 220.

Since the light beams W1, W2 entering the second harmonic wave generating element 200 respectively enter at the incident angles θ1, θ2 different from each other, the light beams W1, W2 respectively elect different light paths along which the light beams W1, W2 are transmitted through the second harmonic wave generating element 200, thus entering the transmissive grating 220. The light beams W1, W2 entering the transmissive grating 220 are diffracted by the grooves 223 of the transmissive grating 220 to be emitted in directions parallel to the optical axis, and proceed towards the resonator mirror 122. The resonator mirror 122 reflects the incident light beam towards the other resonator mirror 121 at a high reflectance of no lower than 90%. The light beams W1, W2 are amplified while being repeatedly reflected between the resonator mirrors 121, 122.

Regarding the light beam reflected by the resonator mirror 122 and proceeding towards the resonator mirror 121, the light path is varied by the transmissive grating 220 for every wavelength, and the light beam is diffracted by the transmissive grating 210 to be a light beam parallel to the optical axis.

Several percentage of the light beam such as the light beams W1, W2 transmitted through the second harmonic wave generating element 200 is converted into a light wave with a half wavelength by the nonlinear optical effect of the second harmonic wave generating element while passing through the second harmonic wave generating element 200. For example, the light beam W1 is converted into a laser beam W3 with a wavelength half as long as the wavelength λ1, and the light beam W2 is converted into a laser beam W4 with a wavelength half as long as the wavelength λ2, and both of them are transmitted through the resonator mirror 122.

On this occasion, the fundamental wave (e.g., W1) and the second harmonic wave (e.g., W3) exist in the second harmonic wave generating element 200 mixed with each other. When it is tilted at an angle θ with respect to the normal line perpendicular to the polarization inversion region 202, the effective polarization inversion period is obtained as Λ/cos (θ), and consequently, the phase matching condition of the second harmonic wave is changed from the Formula 1 described above to a Formula 2 below. Therefore, if the angle θ of the light beam becomes large in the harmonic wave generation of the same polarization inversion period Λ, the wavelength λ for matching the phase also becomes large. Therefore, in the first embodiment, by disposing the transmissive grating between the second harmonic wave generating element 200 and the light source, the light beam proceeding along the optical axis and entering the wavelength conversion element is input to the second harmonic wave generating element 200 at an incident angle increasing in accordance with the wavelength using a diffractive operation of the transmissive grating 210. Thus, the effective polarization inversion period in the light path of the light beam W2 with the wavelength of λ2 entering the second harmonic wave generating element 200 at an incident angle of θ2 becomes "d2." Further, the effective polarization inversion period in the light path of the light beam W1 with the wavelength λ1 larger than that of the light beam W2 entering the second harmonic wave generating element 200 at an incident angle θ1 becomes "d1." When comparing the effective polarization inversion periods in the respective wavelengths, d1>d2 becomes true, and it can be set that the longer wavelength the light beam has, the longer the polarization inversion period becomes.

$$\Lambda/\cos(\theta)=\lambda/2(n_f-n_s) \quad \text{Formula 2}$$

It should be noted that refraction is caused on the boundary surface when the emitted light beam from the transmissive grating 210 enters the second harmonic wave generating element 200, when the light beam entering the second harmonic wave generating element 200 is emitted from the second harmonic wave generating element 200, and when the emitted light beam from the second harmonic wave generating element 200 enters the transmissive grating 220. Therefore, in consideration of the variation in the light path caused by the refraction, the transmissive grating is preferably configured so that the emitted light beam from the wavelength conversion element proceeds in a desired direction, in other words, so as to set the light path of the emitted light beam to a desired direction. For example, it is configured so that the emitted light beam is emitted at a desired diffraction angle by adjusting the blaze angle α, β, and a groove width δ. In the present embodiment, the incident light beam to the wavelength conversion element enters substantially perpendicularly to the entrance surface of the second harmonic wave generating element, and the groove width δ of the transmissive grating 220 is adjusted so that the emitted light beam from the wavelength conversion element is also emitted in a direction substantially perpendicular to the entrance surface of the second harmonic wave generating element, in other words, so that the diffraction angle of the light beam W1 in the transmissive grating 220 becomes the diffraction angle θ1' and the diffraction angle of the light beam W2 therein becomes the diffraction angle θ2' as shown in FIG. 31. By thus adjusting the groove width, both of the incident light beam and the emitted light beam proceed in parallel to the optical axis W, and consequently, the configuration of the light path can be simplified. In the present embodiment, the transmissive gratings 210, 220 having a physical shape for making the incident light beam and the emitted light beam parallel to each other is called "a pair of gratings having a physical shape to be optically symmetric."

A5. Regarding Wavelength Conversion Efficiency

Figure 4A:
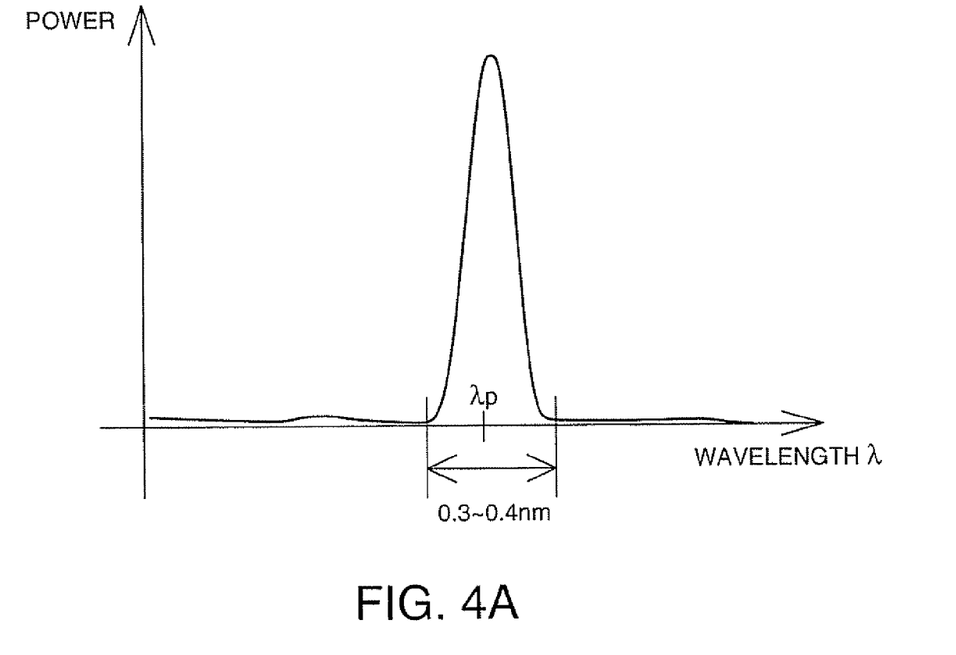
FIGS. 4A and 4B are graphs for explaining wavelength conversion efficiency in the first embodiment.
Figure 4B:
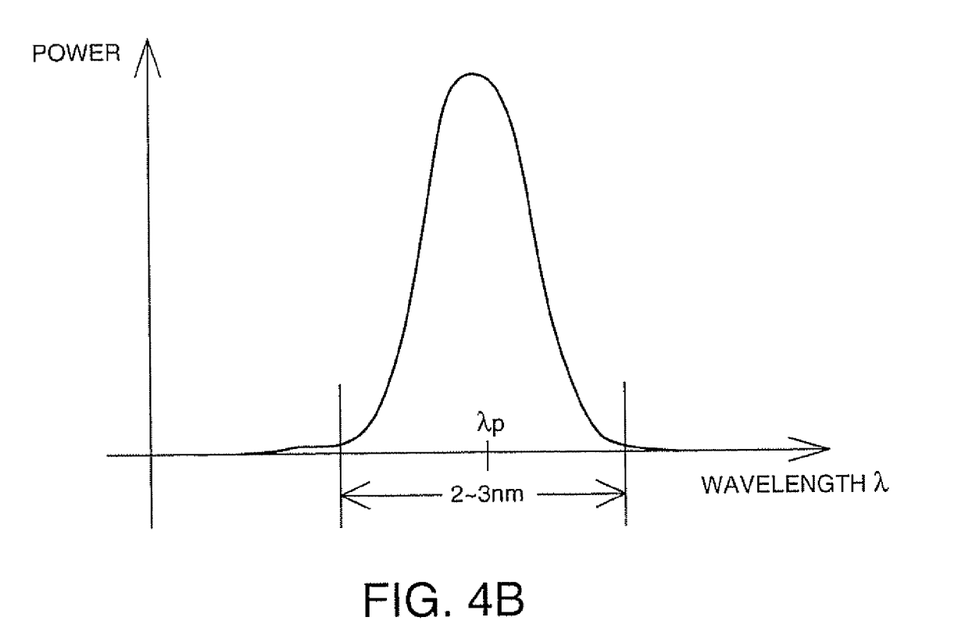

FIG. 4A is a graph for explaining the wavelength conversion efficiency of a wavelength conversion element of the related art not using the transmissive gratings. FIG. 4B is a graph for explaining the wavelength conversion efficiency of the wavelength conversion element according to the first embodiment.

The polarization inversion period Λ of the second harmonic wave generating element is set in accordance with the wavelength of the fundamental wave. The conversion efficiency of the second harmonic wave is proportional to the length of the element, while the range of the wavelengths to be converted simultaneously is inversely proportional to the length of the element. Therefore, in the related art, if attempting to obtain high conversion efficiency, the wavelength range becomes narrow, and in this condition, only the light beams having the fundamental wave with a wavelength included in the range of about to ±0.15 nm through ±0.2 nm around the peak wavelength λp, as shown in FIG. 4A, can only be converted into the second harmonic wave by the second harmonic wave generating element. However, in general, the semiconductor laser device has a variation in the wavelength of the incident light beam (the fundamental wave) to the second harmonic wave generating element caused by the individual difference or the variation in the ambient temperature. Therefore, if the wavelength of the fundamental wave entering the second harmonic wave generating element is not included in the range of about ±0.15 nm through ±0.2 nm around the peak wavelength λp, the conversion efficiency is drastically deteriorated to turn down the output.

In the first embodiment, by using the wavelength conversion element provided with the wavelength dispersive optical elements (the transmissive gratings in the first embodiment) having the diffraction angle increasing in accordance with the wavelength, the light beam entering the second harmonic wave generating element can automatically select the suitable polarization inversion period for every wavelength. As a result, the wavelength conversion element of the first embodiment can convert the light beam with a wavelength included in a wider range than in the case of the wavelength conversion element of the related art into the second harmonic wave. In the first embodiment, as shown in FIG. 4B, the light beam with a wavelength included in the range of more than ±1.0 nm around the peak wavelength λp is converted into the second harmonic wave by the wavelength conversion element.

According to the wavelength conversion element of the first embodiment described hereinabove, the incident light beam (the fundamental wave) can be diffracted with the diffraction angle increasing in accordance with increase in the wavelength. Therefore, the longer wavelength the light beam has, the longer polarization inversion period is selected automatically. In other words, the light beam entering the second harmonic wave generating element of the wavelength conversion element can pass through a light path with a polarization inversion period suitable for the wavelength. Therefore, even if the variation in the wavelength caused by the individual difference of the semiconductor laser device or the ambient temperature occurs, the phase matching of the second harmonic wave can effectively be performed. Therefore, since the conversion efficiency from the fundamental wave to the second harmonic wave can be improved, the laser oscillation can stably be performed, thus stabilizing the output power of the laser.

B. Second Embodiment

In the second embodiment, the wavelength conversion element having the diffraction surface provided with the blaze of the transmissive grating disposed facing the second harmonic wave generating element is explained with reference to FIGS. 5 and 6.

B1. Configuration of Wavelength Conversion Element

Figure 5:
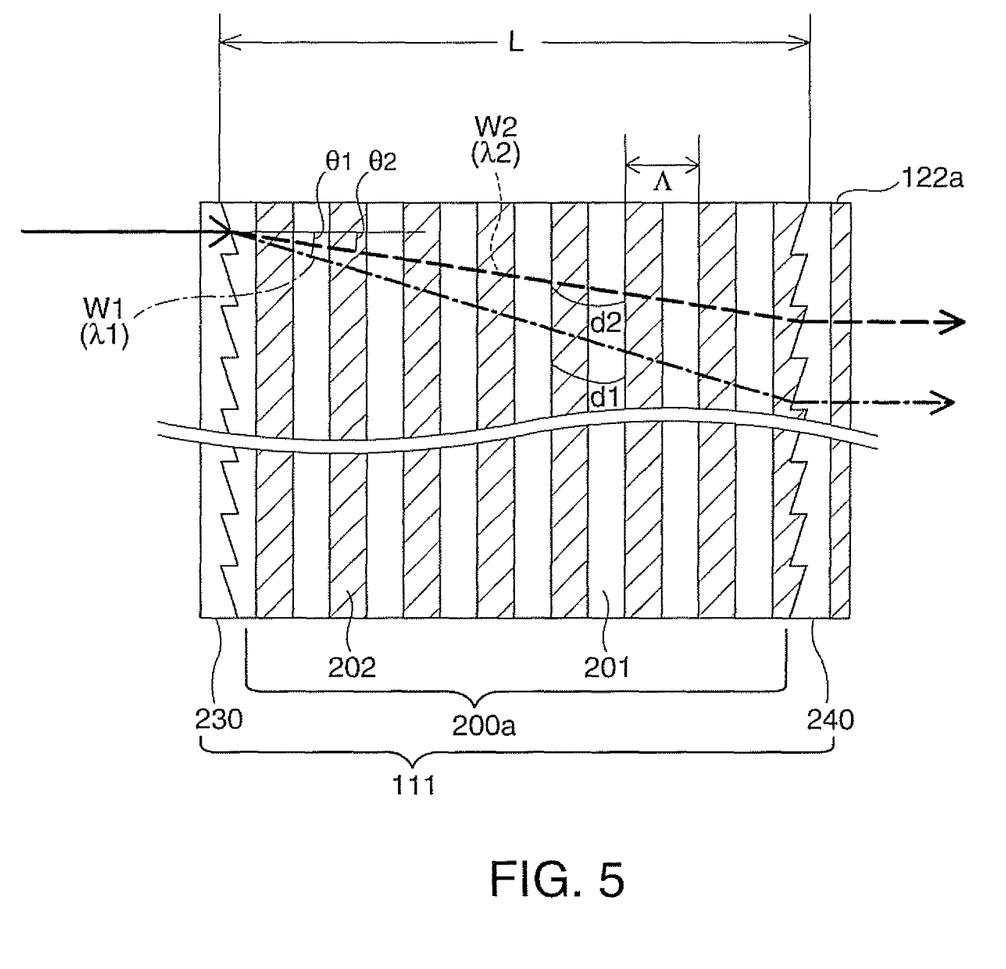
FIG. 5 is a schematic diagram for explaining a wavelength conversion element according to a second embodiment.

FIG. 5 is a schematic diagram for explaining a wavelength conversion element according to the second embodiment. FIG. 6 is a schematic diagram for explaining a structure of the wavelength conversion element according to the second embodiment. The wavelength conversion element 111 of the second embodiment is provided with transmissive gratings 230, 240, and a second harmonic wave generating element 200a. The second harmonic wave generating element 200a has the polarization regions 201 and the polarization inversion regions 202 having polarization directions different from each other.

Figure 6:
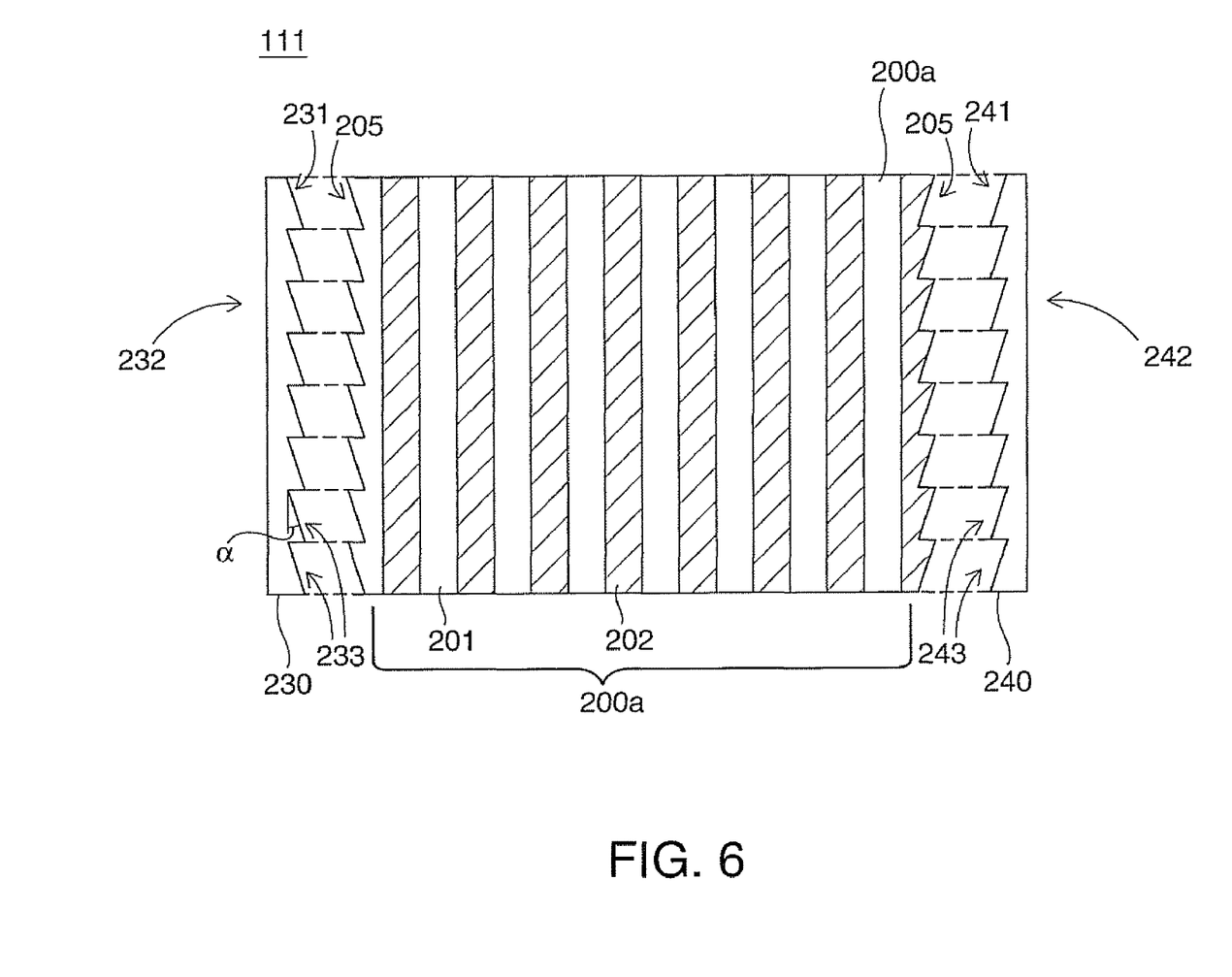
FIG. 6 is a schematic diagram for explaining a structure of the wavelength conversion element according to the second embodiment.

As shown in FIG. 6, the transmissive grating 230 is provided with a plurality of grooves 233 formed on a first surface 231 facing the second harmonic wave generating element 200a in a direction perpendicular to the optical axis W at substantially even intervals, and a planar shape on a second surface 232 opposite to the first surface. The cross-section of the groove 233 is a saw-tooth shape, and formed to have a blaze angle of α.

Similarly, the transmissive grating 240 is provided with a plurality of grooves 243 formed on a first surface 241 facing the second harmonic wave generating element 200a in a direction perpendicular to the optical axis W at substantially even intervals, and a planar shape on a second surface 242 opposite to the first surface. The cross-section of the groove 243 is a saw-tooth shape, and formed to have a blaze angle of α. Further, on the second surface 242 of the transmissive grating 240, there is formed a resonator mirror 122a formed, for example, of a semiconductor multilayer film or a dielectric multilayer film. By thus configured, it becomes unnecessary to separately prepare the resonator mirror 122a to be implemented therein, thus simplifying the assembling process. Further, the resonator mirror 122a can be implemented therein in the manufacturing process of the transmissive grating.

The second harmonic wave generating element 200a and the transmissive gratings 230, 240 can be bonded with each other.

B2. Operation of Wavelength Conversion Element

An operation of the wavelength conversion element according to the second embodiment of the invention will be explained with reference to FIG. 5. Similarly to the case with the first embodiment, in the second embodiment, the explanation will be presented exemplifying light beams W1, W2 respectively having two kinds of wavelengths $\lambda 1$, $\lambda 2$ ($\lambda 1 < \lambda 2$) fundamental waves F emitted from the semiconductor laser device 100a. In the case with the light beam W2 having the fundamental wave F with a wavelength of $\lambda 2$, the light beam W2 is diffracted at a diffraction angle $\theta 2$ corresponding to the wavelength $\lambda 2$, and then enters the second harmonic wave generating element 200a. On the other hand, in the case with the light beam W1 having the fundamental wave F with the wavelength $\lambda 1$, the light beam W1 is diffracted at a diffraction angle $\theta 1$ greater than the diffraction angle $\theta 2$, and enters the second harmonic wave generating element 200a. Specifically, the light beam W2 with the wavelength $\lambda 2$ enters the second harmonic wave generating element 200a at an incident angle $\theta 2$, and the light beam W1 with the wavelength $\lambda 1$ larger than the wavelength $\lambda 2$ enters the second harmonic wave generating element 200a at an incident angle $\theta 1$.

About several percentage of the light beam such as the light beams W1, W2 transmitted through the second harmonic wave generating element 200a is converted into a light wave with a half wavelength by the nonlinear optical effect of the second harmonic wave generating element while passing through the second harmonic wave generating element 200a.

Since the light beams W1, W2 entering the second harmonic wave generating element 200a respectively enter at the incident angles $\theta 1$, $\theta 2$ corresponding to the wavelengths and different from each other, the light beam with the longer wavelength passes through the second harmonic wave generating element 200a selecting a longer polarization inversion period. By thus configured, the phase matching of the second harmonic wave can be performed in each of the wavelengths.

According to the wavelength conversion element of the second embodiment described hereinabove, since the phase matching of the second harmonic wave can always be performed, and the fundamental wave can efficiently be converted into the second harmonic wave, the laser oscillation can stably be performed. Further, since the diffraction surfaces of the transmissive gratings are configured to have contact with the second harmonic wave generating element, the surface reflection can be reduced, thus the laser oscillation efficiency can be improved.

C. Third Embodiment

In the third embodiment, the wavelength conversion element is configured using transmissive gratings having a rectangular groove cross-section.

C1. Configuration of Wavelength Conversion Element

Figure 7:
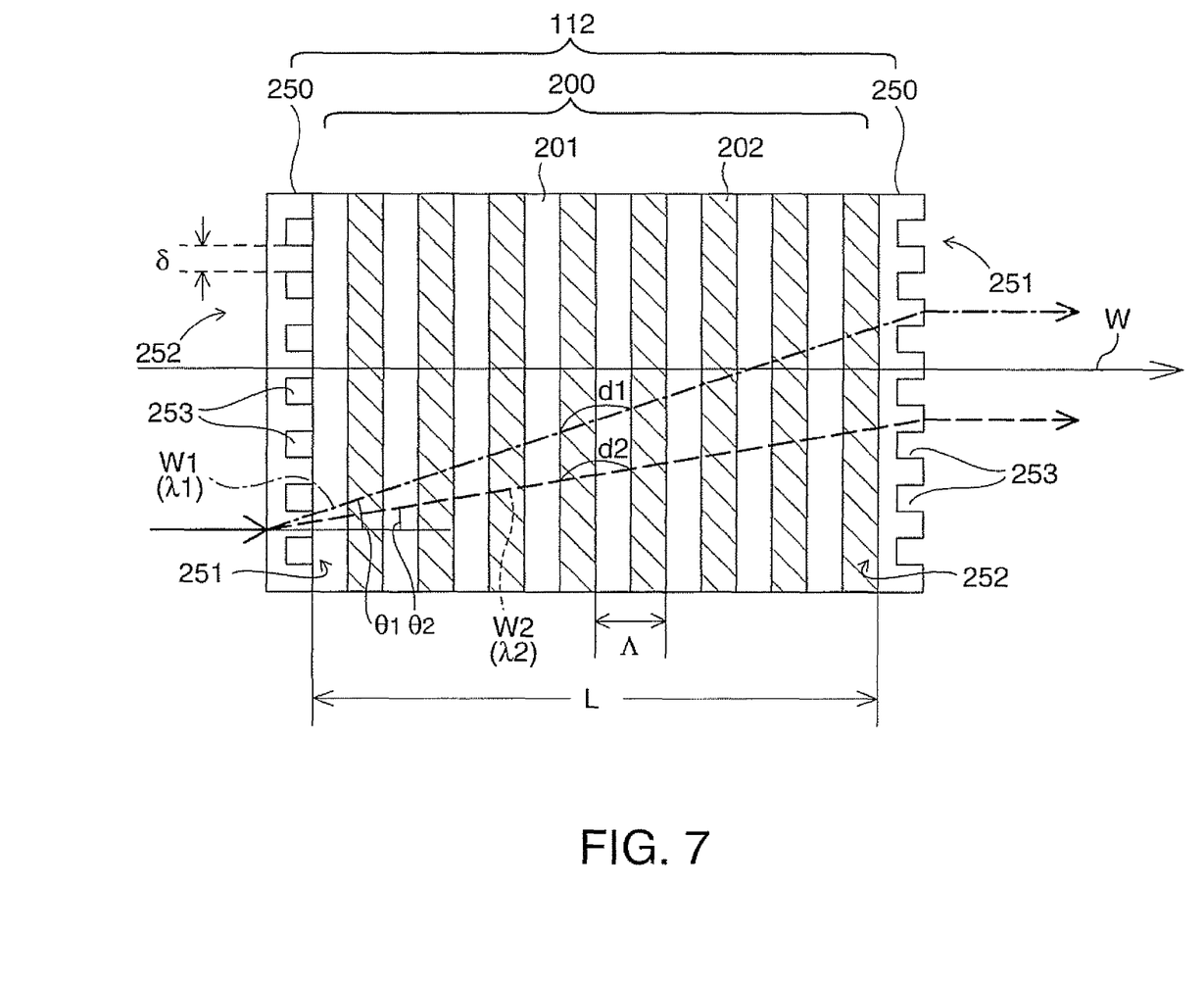
FIG. 7 is a schematic diagram for explaining a wavelength conversion element according to a third embodiment.

FIG. 7 is a schematic diagram for explaining the wavelength conversion element according to the third embodiment. The wavelength conversion element 112 of the third embodiment is provided with transmissive gratings 250 and the second harmonic wave generating element 200. The second harmonic wave generating element 200 is the same as the second harmonic wave generating element explained in the first embodiment, and consequently, the explanations therefor will be omitted.

As shown in FIG. 7, the transmissive grating 250 is provided with a plurality of grooves 253 formed on a first surface 251 facing the second harmonic wave generating element 200 at substantially even intervals, and a planar shape on a second surface 252 opposite to the first surface 251. As shown in FIG. 7, the groove 253 is formed so that the cross section thereof has a rectangular shape. The transmissive grating 250 has the same configuration as the transmissive grating 210 of the first embodiment except the difference in the shape of the cross section of the groove. It should be noted that the second surface of the transmissive grating 250 disposed on the entrance side can face the second harmonic wave generating element, or the first surface of the transmissive grating 250 disposed on the emission side can face the second harmonic wave generating element.

C2. Regarding Operation of Wavelength Conversion Element

An operation of the wavelength conversion element according to the third embodiment of the invention will be explained with reference to FIG. 7. Similarly to the case with the first embodiment, in the third embodiment, the explanation will be presented exemplifying light beams W1, W2 respectively having two kinds of wavelengths λ1, λ2 (λ1>λ2) as the fundamental waves F emitted from the semiconductor laser device 100a. In the case with the light beam W2 having the fundamental wave F with a wavelength of λ2, the light beam W2 is diffracted by the transmissive grating 250 at a diffraction angle θ2 corresponding to the wavelength λ2, and then enters the second harmonic wave generating element 200. On the other hand, in the case with the light beam W1 having the fundamental wave F with the wavelength λ1, the light beam W1 is diffracted by the transmissive grating 250 at a diffraction angle θ1 greater than the diffraction angle θ2, and enters the second harmonic wave generating element 200. Specifically, the light beam W2 with the wavelength λ2 enters the second harmonic wave generating element 200 at an incident angle θ2, and the light beam with the wavelength λ1 larger than the wavelength λ2 enters the second harmonic wave generating element 200 at an incident angle θ1.

Since the light beams W1, W2 entering the second harmonic wave generating element 200 respectively enter at the incident angles θ1, θ2 different from each other, the light beams W1, W2 are transmitted through the second harmonic wave generating element 200 along different light paths, thus entering the transmissive grating 250. The light beam entering the transmissive grating 250 is diffracted by the transmissive grating 250 to be emitted in a direction along the optical axis, and proceeds towards the resonator mirror 122. The resonator mirror 122 reflects the incident light beam towards the other resonator mirror 121 at a high reflectance of no lower than 90%. The light beams W1, W2 are amplified while being repeatedly reflected between the resonator mirrors 121, 122.

Several percentage of the light beam such as the light beams W1, W2 transmitted through the second harmonic wave generating element 200 is converted into a light wave with a half wavelength by the nonlinear optical effect of the second harmonic wave generating element while passing through the second harmonic wave generating element 200.

Since the light beams W1, W2 entering the second harmonic wave generating element 200 respectively enter at the incident angles θ1, θ2 corresponding to the wavelengths and different from each other, the light beam with the longer wavelength passes through the second harmonic wave generating element 200 selecting a longer polarization inversion period. Thus, the phase matching of the second harmonic wave can be performed in a pseudo manner.

According to the wavelength conversion element of the third embodiment described hereinabove, since the phase matching of the second harmonic wave can always be performed by the wavelength conversion element, and the fundamental wave can efficiently be converted into the second harmonic wave, the laser oscillation can stably be performed. Further, since the transmissive grating with the rectangular groove cross section can control the peak wavelength of the light beam to be diffracted by the depth of the groove and the groove width to the groove pitch, the peak wavelength of the light beam to be diffracted can be set to a desired value with a simple configuration.

D. Fourth Embodiment

In the fourth embodiment, a projector for displaying an image using a digital micromirror device (DMD) will be explained.

D1. Schematic Configuration of Projector

Figure 8:
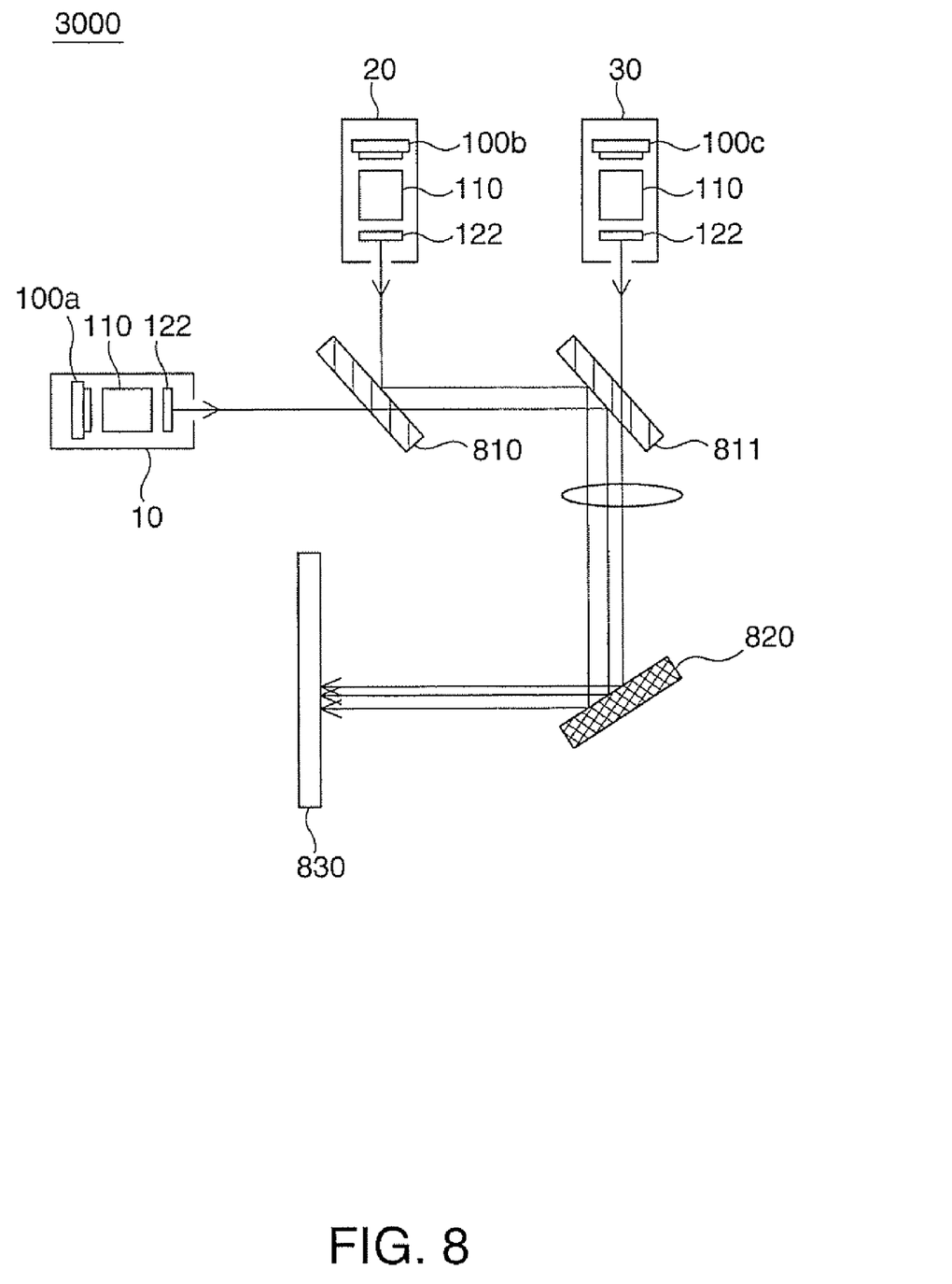
FIG. 8 is an explanatory diagram for exemplifying a schematic configuration of a projector according to a fourth embodiment.

FIG. 8 is an explanatory diagram for exemplifying a schematic configuration of the projector according to the fourth embodiment. The projector 3000 of the fourth embodiment is provided with light source devices 10, 20, and 30 similar to those of the first embodiment, dichroic mirrors 810, 811, and a digital micromirror device (DMD) 820.

The light source devices 10, 20, and 30 are similar to those of the first embodiment. Therefore, each of the light source devices is provided with a wavelength conversion element composed of transmissive gratings and a second harmonic wave generating element. Consequently, in each of the light source devices, the fundamental wave emitted from the light source is converted into the second harmonic wave by the wavelength conversion element composed of the transmissive gratings and the second harmonic wave generating element, and the laser beam with stabled power is emitted from each of the light source devices.

The dichroic mirrors 810, 811 are formed by coating the glass substrates with films for reflecting a specific wavelength band, and thus transmitting a light beam with a specific wavelength. The dichroic mirrors 810, 811 function as filters for separating the incident light beam-n into the three primary colors of light components, the red, green, and blue components. In the present embodiment, the dichroic mirror 810 transmits the red component while reflecting the green component. Further, the dichroic mirror 811 reflects the red component and the green component while transmitting the blue component.

The DMD 820 is a kind of an MEMS device, and a display element having a number of micromirrors arranged in a plane.

According to the configuration described above, since the light source devices are each provided with the wavelength conversion element composed of the transmissive gratings and the second harmonic wave generating element, the laser beams with stable power are emitted from the light source devices. Therefore, according to the projector of the fourth embodiment, an image with stable brightness can be displayed.

E. Fifth Embodiment

In the fifth embodiment, a monitor device using the light source device including a wavelength conversion element composed of transmissive gratings and a second harmonic wave generating element will be explained.

E1. Schematic Configuration of Monitor Device

Figure 9:
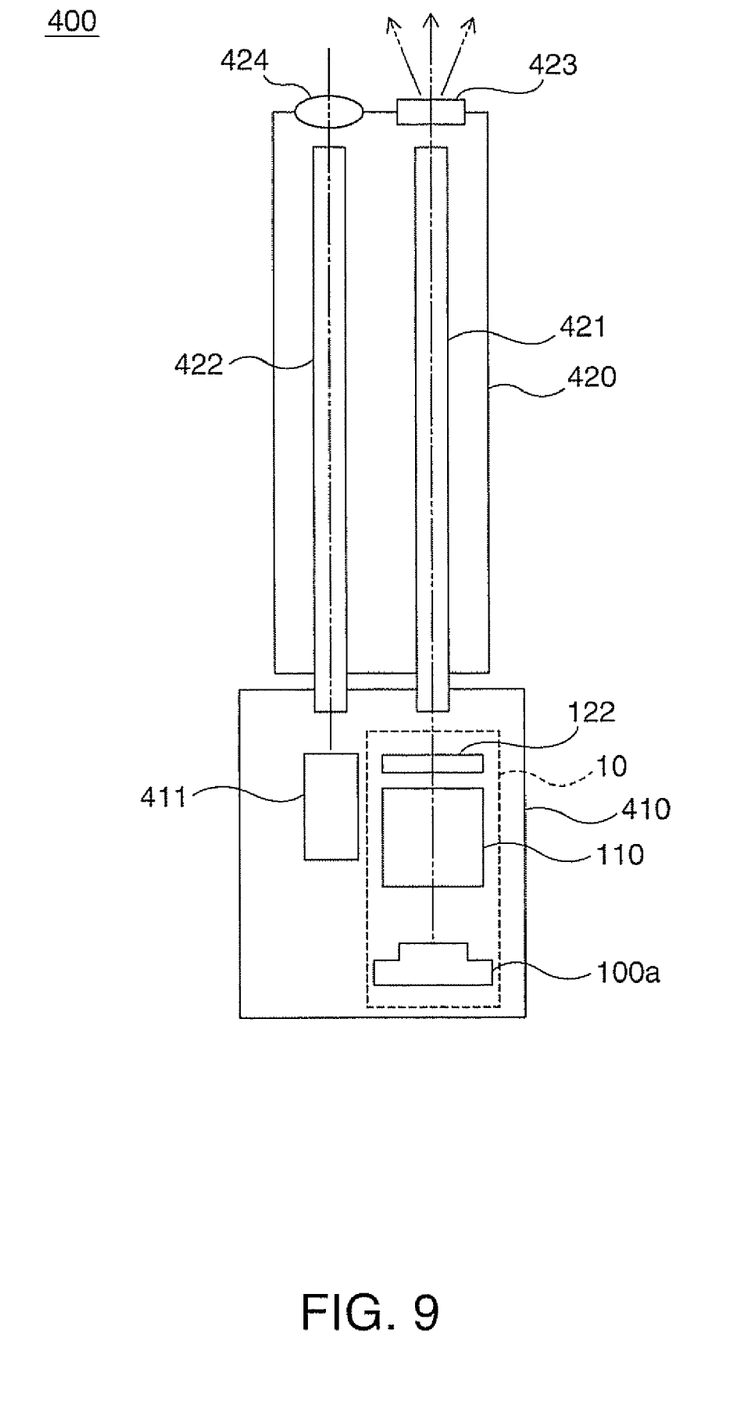
FIG. 9 is an explanatory diagram for exemplifying a monitor device according to a fifth embodiment.

FIG. 9 is an explanatory diagram for exemplifying a monitor device 400 according to a fifth embodiment. The monitor device 400 is provided with a device main body 410 and an optical transmission section 420. The device main body 410 is provided with the light source device 10 of the first embodiment described above. As explained in the first embodiment, the light source device 10 is provided with the semiconductor laser device 100a, the wavelength conversion element 110, and the resonator 120.

The optical transmission section 420 is provided with two light guides 421, 422 of a light transmission side and a light reception side, respectively. Each of the light guides 421, 422 is a bundle of a number of optical fibers, and is capable of transmitting a laser beam over a long distance. On the entrance side of the light guide 421 of the light transmission side, there is disposed the light source device 10, while on the emission side thereof there is disposed a diffusion plate 423. The laser beam output from the light source device 10 is transmitted to the diffusion plate 423 disposed on the tip of the light transmission section 420 through the light guide 421, and is diffused by the diffusion plate 423 to irradiate an object.

On the tip of the light transmission section 420, there is also provided an imaging lens 424, and the reflected light beam from the subject can be received by the imaging lens 424. The received reflected light beam is transmitted through the light guide 422 of the light reception side to a camera 411 as an image pickup section disposed inside the device main body 410. As a result, an image based on the reflected light beam obtained by irradiating the subject with the laser beam emitted from the light source device 10 can be imaged by the camera 411.

According to the configuration described above, since the light source device is provided with the wavelength conversion element composed of the transmissive gratings and the second harmonic wave generating element, the laser beam with stable power can be emitted from the light source. Therefore, according to the monitor device of the fifth embodiment, an image with stable brightness can be displayed. Since the monitor device is often used in the environment such as a medical scene in which the output of the stable power is required, convenience of the user can be enhanced.

F. Modified Examples

1. Although in the first through third embodiments, the second harmonic wave generating element and the transmissive gratings are disposed adjacently to each other, it is possible to provide a predetermined distance between the second harmonic wave generating element and the transmissive gratings.

2. Although in the first through third embodiment, the transmissive gratings are disposed on both of the entrance surface side and the emission surface side of the second harmonic wave generating element, it is enough for the transmissive grating to be disposed at least on the entrance surface side of the second harmonic wave generating element. In such a case, since the incident light beam and the emitted light beam are different in the proceeding direction, it is preferable to dispose an appropriate optical element on the emission side thereof considering the light path.

3. It is also possible to form the transmissive grating at the same time as the patterning of the polarization regions and the polarization inversion regions of the second harmonic wave generating element.

4. The shape of the cross section of the groove of the transmissive grating 220 is not limited to the saw-tooth shape or the rectangular shape, but can be a sinusoidal shape, for example.

5. In the configurations described hereinabove, although the direction W of the light beam entering the wavelength dispersive optical element and the normal line of the polarization inversion regions are parallel to each other, the direction W of the light beam entering the wavelength dispersive optical element and the normal line of the polarization inversion regions can form a predetermined angle.

6. Although in the embodiments described above, the wavelength conversion element described above is provided to the projector using the liquid crystal or the DMD, the wavelength conversion element described above can be provided, for example, to a scan-type image display device.

Hereinabove, various embodiments of the invention are described. The invention is not limited to these embodiments, but can take various configurations within the scope of the invention.

What is claimed is:

1. A wavelength conversion element comprising:
    a second harmonic wave generating element provided with:
        (i) an entrance surface;
        (ii) an emission surface;
        (iii) a cyclic polarization inversion structure; and
        (iv) a first wavelength dispersive optical element disposed on the entrance surface side of the second harmonic wave generating element; and
    a second wavelength dispersive optical element disposed on the emission surface side of the second harmonic wave generating element,
    the second harmonic wave generating element converting an incident fundamental wave having a first wavelength into a second harmonic wave having a second wavelength, and emitting the second harmonic wave;
    the cyclic polarization inversion structure being configured so as to be able to match a phase of the second harmonic wave in a pseudo manner;
    wherein the second wavelength being different than the first wavelength; and
    the first wavelength dispersive optical element having a first diffraction surface that diffracts an incident light beam with a diffraction angle increasing in accordance with a wavelength of an incident light beam to disperse the incident light beam by the wavelength of the incident light beam, and that emits the light beam dispersed in the first diffraction surface towards the second harmonic wave generating element; and
    the second wavelength dispersion optical element having a second diffraction surface that diffracts an incident light beam with a diffraction angle increasing in accordance with a wavelength of the incident light beam to disperse the incident light beam by the wavelength of the incident light beam, the second diffraction surface being configured to have a diffraction angle, which corresponds to a light beam with a predetermined wavelength, substantially identical to a diffraction angle of the first diffraction surface, which corresponds to a light beam with the predetermined wavelength.

2. The wavelength conversion element according to claim 1,
    the second wavelength dispersive optical element having a planar surface on an opposite side to a surface facing the second harmonic wave generating element; and
    the surface facing the second harmonic wave generating element and the emission surface of the second harmonic wave generating element being bonded with each other.

3. The wavelength conversion element according to claim 1,
    the first wavelength dispersive optical element having a planar surface on an opposite side to a surface facing the second harmonic wave generating element, and the surface facing the second harmonic wave generating element and the entrance surface of the second harmonic wave generating element being bonded with each other.

4. The wavelength conversion element according to claim 1,
    the first wavelength dispersive optical element being a transmissive grating having the first diffractive surface formed with a saw-tooth shape.

5. The wavelength conversion element according to claim 1,
wherein the second wavelength dispersive optical element is a transmissive grating having the second diffractive surface formed to have a saw-tooth shape.

6. A light source device comprising:
the wavelength conversion element according to claim 1;
a light source that emits a fundamental wave corresponding to the incident fundamental wave of the wavelength conversion element; and
a reflecting member disposed on an emission side of the wavelength conversion element, that reflects the fundamental wave and that transmits the second harmonic wave.

7. A light source device comprising:
the wavelength conversion element according to claim 1,
a light source that emits fundamental wave corresponding to the incident fundamental wave of the wavelength conversion element; and
a reflecting member that reflects the fundamental wave and that transmits the second harmonic wave,
the second wavelength dispersive optical element being disposed so that the second diffraction surface faces the second harmonic wave generating element, and having a planar surface on an opposite side to the second diffraction surface with respect to the second harmonic wave generating element; and
the reflecting member being formed on the planar surface of the second wavelength dispersive optical element.

8. An image display device comprising:
the light source device according to claim 6; and
a projection section that projects an image formed by the light beam emitted from the light source device.

9. A monitor device comprising:
the light source device according to claim 6; and
an imaging section that shoots a subject irradiated with the light beam emitted from the light source device.

10. A wavelength conversion element comprising:
(i) a second harmonic wave generating unit provided with a cyclic polarization inversion unit;
(ii) a first wavelength dispersive optical unit; and
(iii) a second wavelength dispersive optical unit;
the first wavelength dispersive optical unit
(a) diffracting an incident light of the first wavelength dispersive optical unit; and
(b) emitting the diffracted light of the dispersive optical unit to the second harmonic wave generating unit;
the second harmonic wave generating unit converting an incident fundamental wave having a first wavelength into a second harmonic wave having a second wavelength, the incident fundamental wave corresponding to the diffracted light emitted from the first wavelength dispersive optical unit, and the second harmonic wave corresponding to an incident light of the second wavelength dispersive optical unit;
the second wavelength dispersive optical unit:
(a) diffracting an incident light of the second wavelength dispersive optical unit corresponding to the second harmonic wave emitted by the second harmonic generating unit; and
(b) emitting the diffracted light of the second wavelength dispersive unit.

11. The wavelength conversion element of claim 10:
the first wavelength dispersive optical unit and the second wavelength dispersive optical unit having substantially the same angles of diffraction.

12. The wavelength conversion element of claim 10:
the cyclic polarization inversion unit matching a phase of the second harmonic wave in a pseudo manner.

13. The wavelength conversion element of claim 10:
the diffracted light of the second wavelength dispersive unit being substantially parallel to the incident light of the first wavelength dispersive optical unit.

14. The wavelength conversion element of claim 10:
the second wavelength of the a second harmonic wave being approximately half the first wavelength of the incident fundamental wave.

15. The wavelength conversion element of claim 12:
the cyclic polarization inversion unit matching a phase of the second harmonic wave in a pseudo manner using quasi-phase matching (QPM).

* * * * *